(No Model.)  10 Sheets—Sheet 1.

F. A. JOHNSON.
TYPE CASTING AND COMPOSING MACHINE.

No. 533,848. Patented Feb. 5, 1895.

Witnesses
Robert Watson
Will E. Neff

Inventor
Frank Amos Johnson
By J. A. Watson
Attorney (No Model.)  10 Sheets—Sheet 2.
F. A. JOHNSON.
TYPE CASTING AND COMPOSING MACHINE.
No. 533,848.  Patented Feb. 5, 1895.

Witnesses
Robert Watson
Will E. Neff

Inventor
Frank Amos Johnson
By J. A. Watson
Atty (No Model.) 10 Sheets—Sheet 5.
F. A. JOHNSON.
TYPE CASTING AND COMPOSING MACHINE.

No. 533,848. Patented Feb. 5, 1895.

Witnesses
Robert Watson
Will E. Neff

Inventor
Frank Amos Johnson
By J. H. Watson, Atty

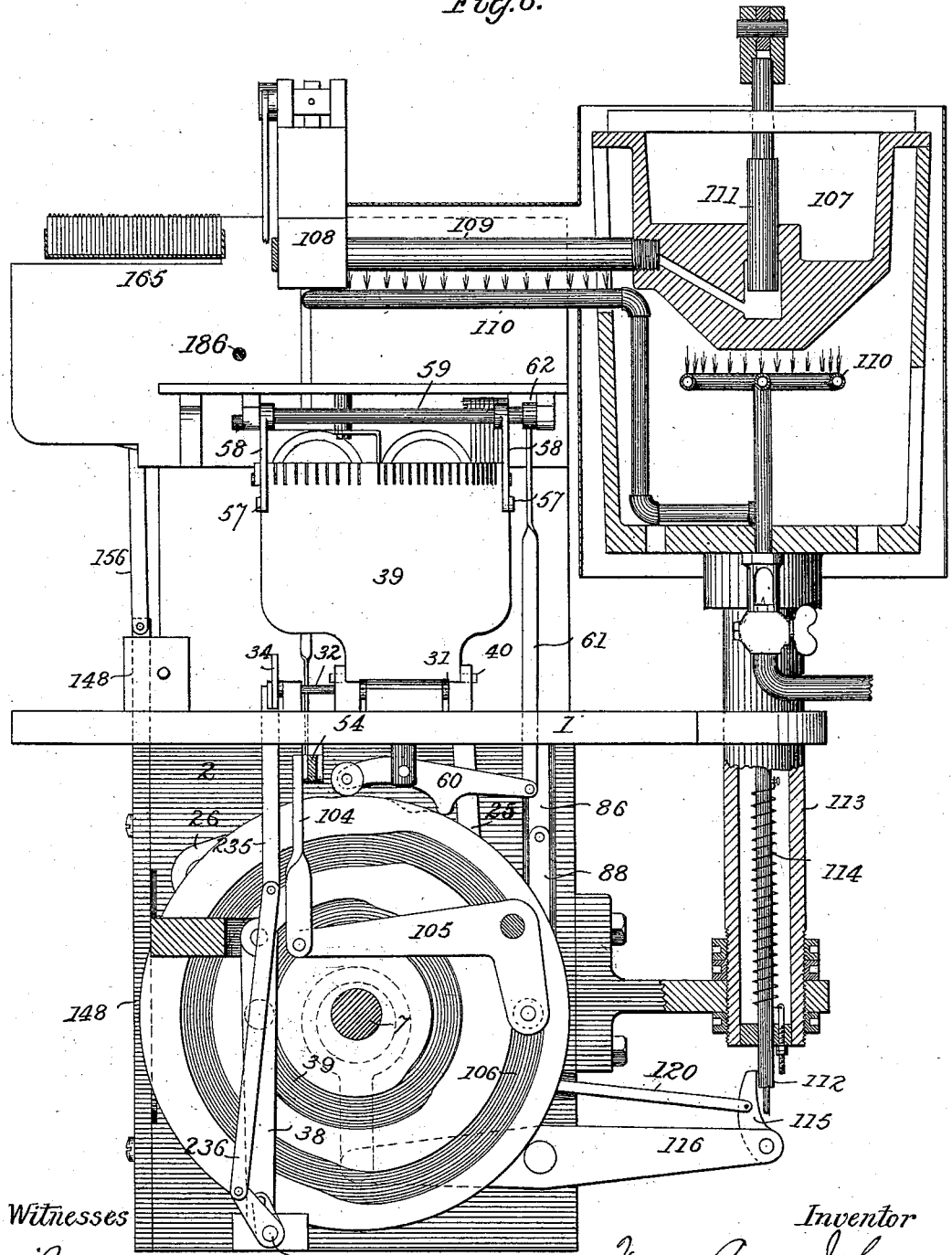

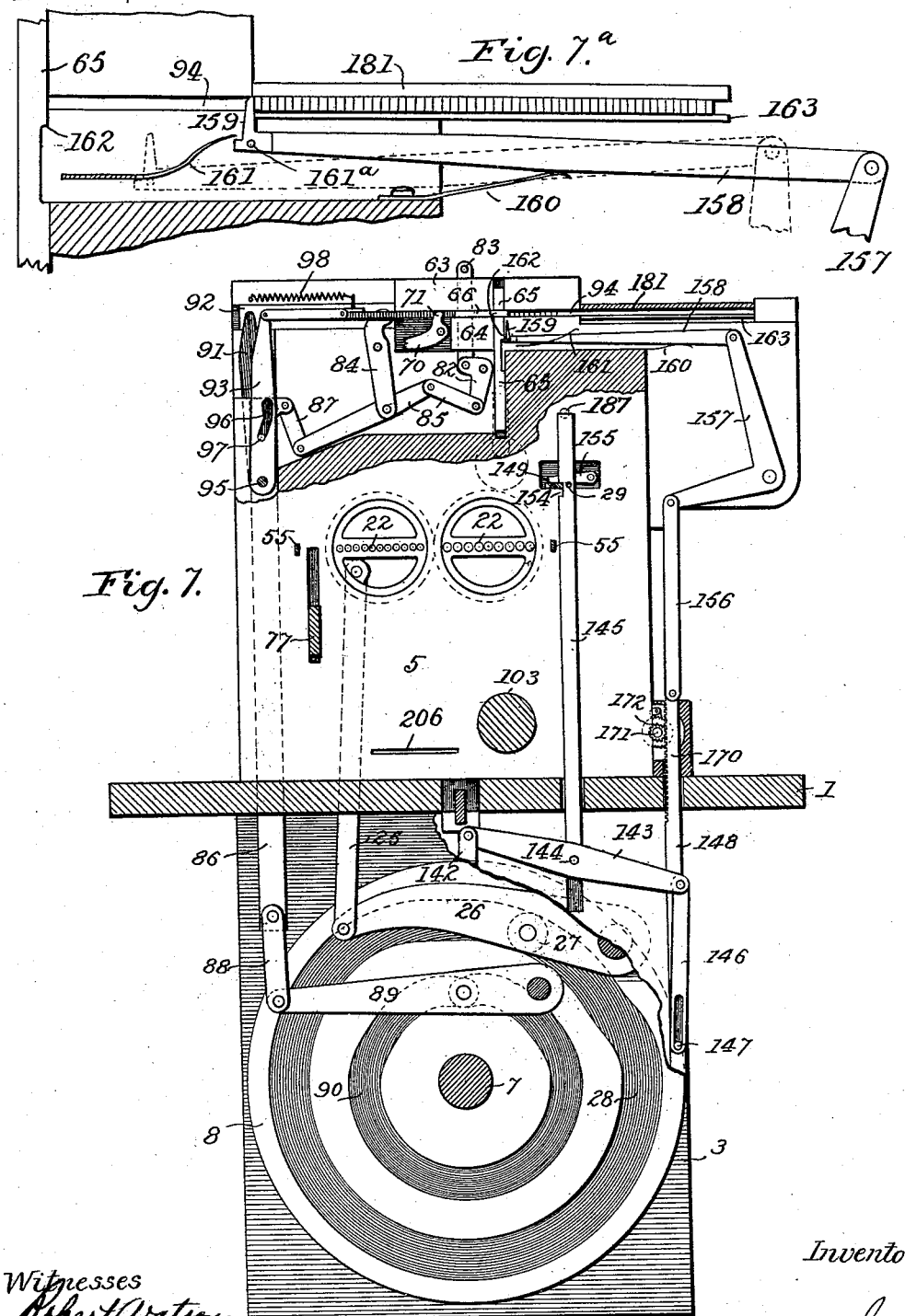

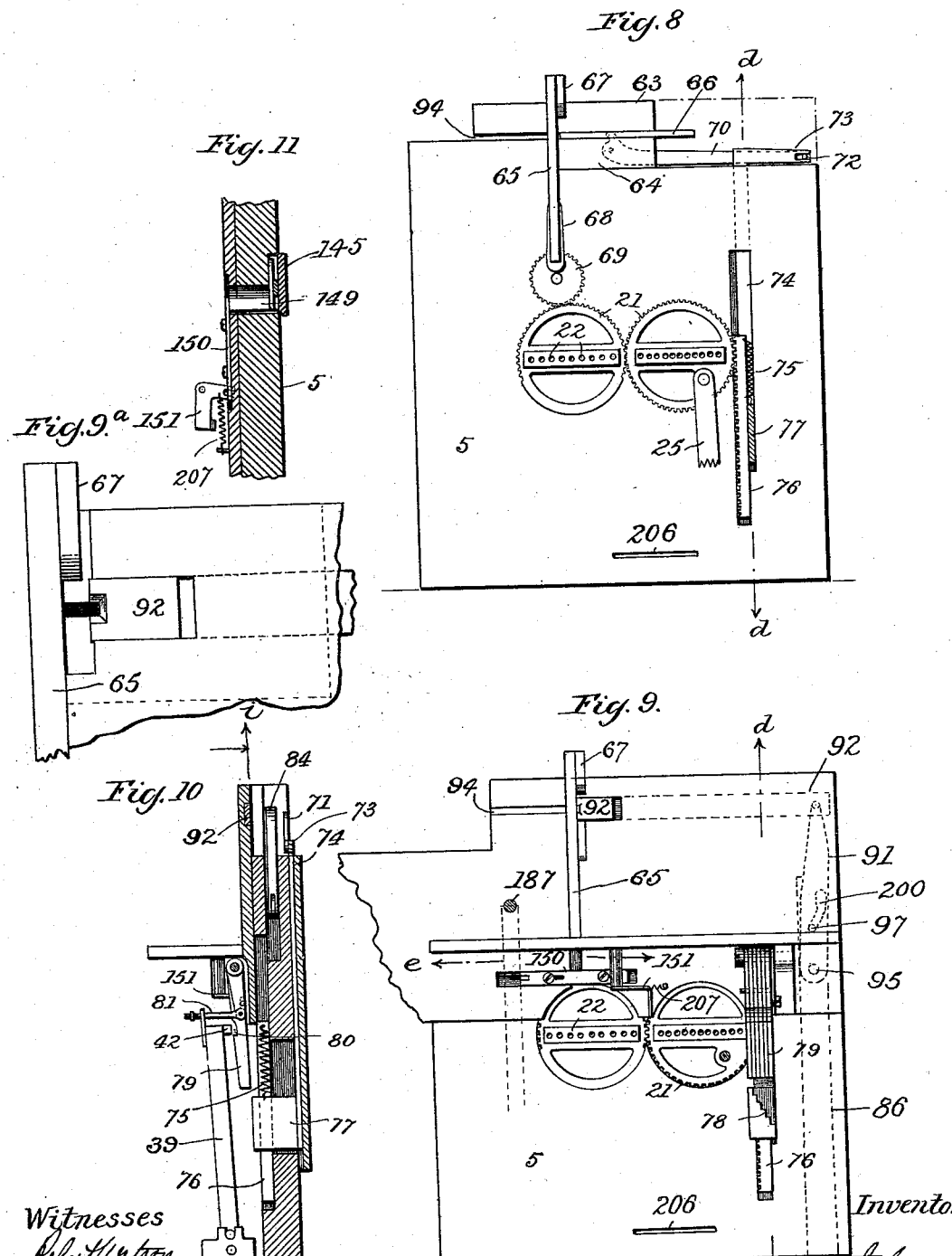

(No Model.) 10 Sheets—Sheet 9.
F. A. JOHNSON.
TYPE CASTING AND COMPOSING MACHINE.
No. 533,848. Patented Feb. 5, 1895.
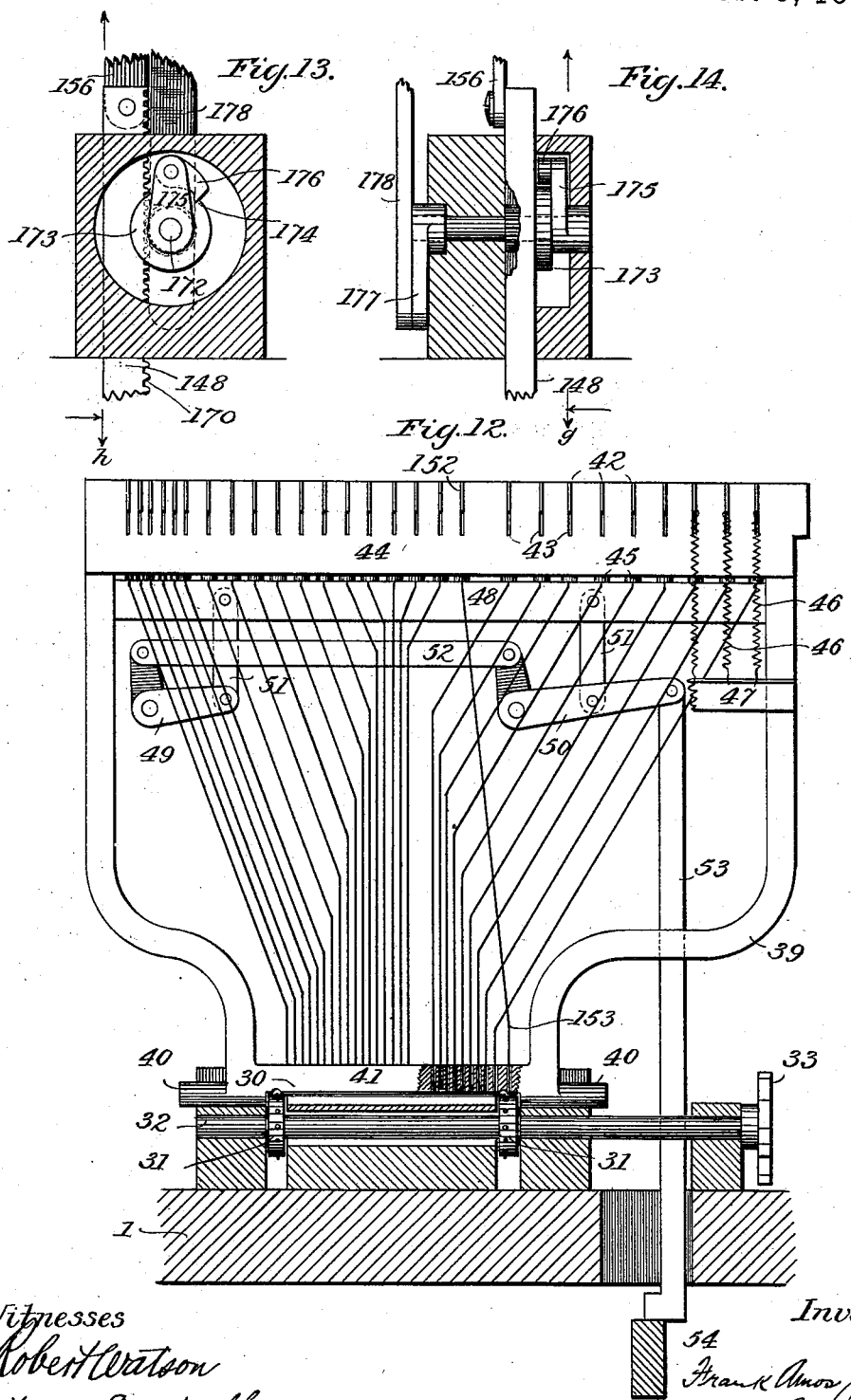
Witnesses
Robert Watson
Will E. Neff
Inventor
Frank Amos Johnson
By J. H. Watson
Atty (No Model.)
F. A. JOHNSON.
TYPE CASTING AND COMPOSING MACHINE.
No. 533,848. Patented Feb. 5, 1895.
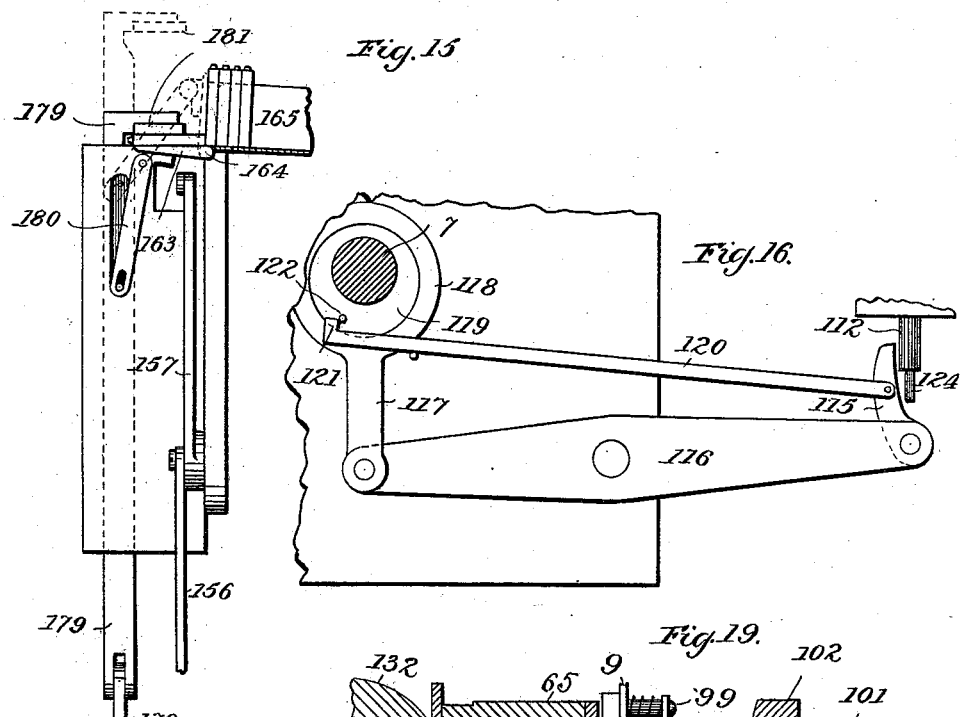
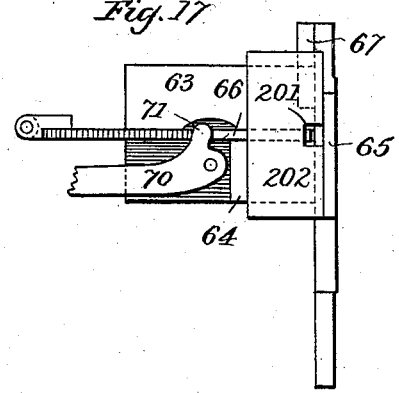
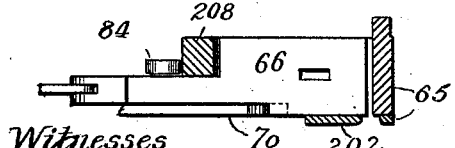
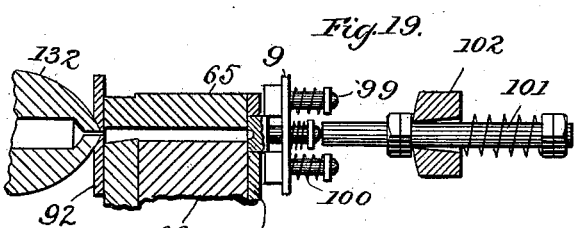
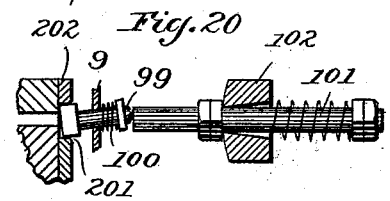
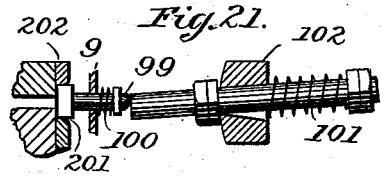
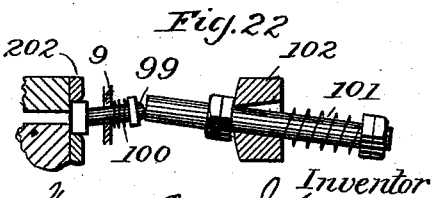
Witnesses
Robert H. Watson
Will E. Neff
Inventor
Frank Amos Johnson
By J. H. Watson, Atty

UNITED STATES PATENT OFFICE.

FRANK AMOS JOHNSON, OF PHILADELPHIA, PENNSYLVANIA, ASSIGNOR TO THE TACHYTYPE MANUFACTURING COMPANY, OF MINNEAPOLIS, MINNESOTA.

TYPE CASTING AND COMPOSING MACHINE.

SPECIFICATION forming part of Letters Patent No. 533,848, dated February 5, 1895.

Application filed September 5, 1894. Serial No. 522,211. (No model.)

*To all whom it may concern:*

Be it known that I, FRANK AMOS JOHNSON, a citizen of the United States, residing at Philadelphia, in the county of Philadelphia and State of Pennsylvania, have invented certain new and useful Improvements in Type Casting and Composing Machines, of which the following is a specification.

My invention relates to type casting and composing machines.

In the present machine the type are cast consecutively and set up in justified lines in a galley, the operation being controlled by a mechanical controller. Some of the features of the invention are capable of a wider application and may be employed, for instance, in matrix making, typewriting, linotype, and type casting machines and for such features I desire protection commensurate with their usefulness.

For the purpose of this specification I shall describe the invention as embodied in a type casting and composing machine, governed by a perforated paper strip as illustrated in the accompanying drawings, in which—

Figure 1:
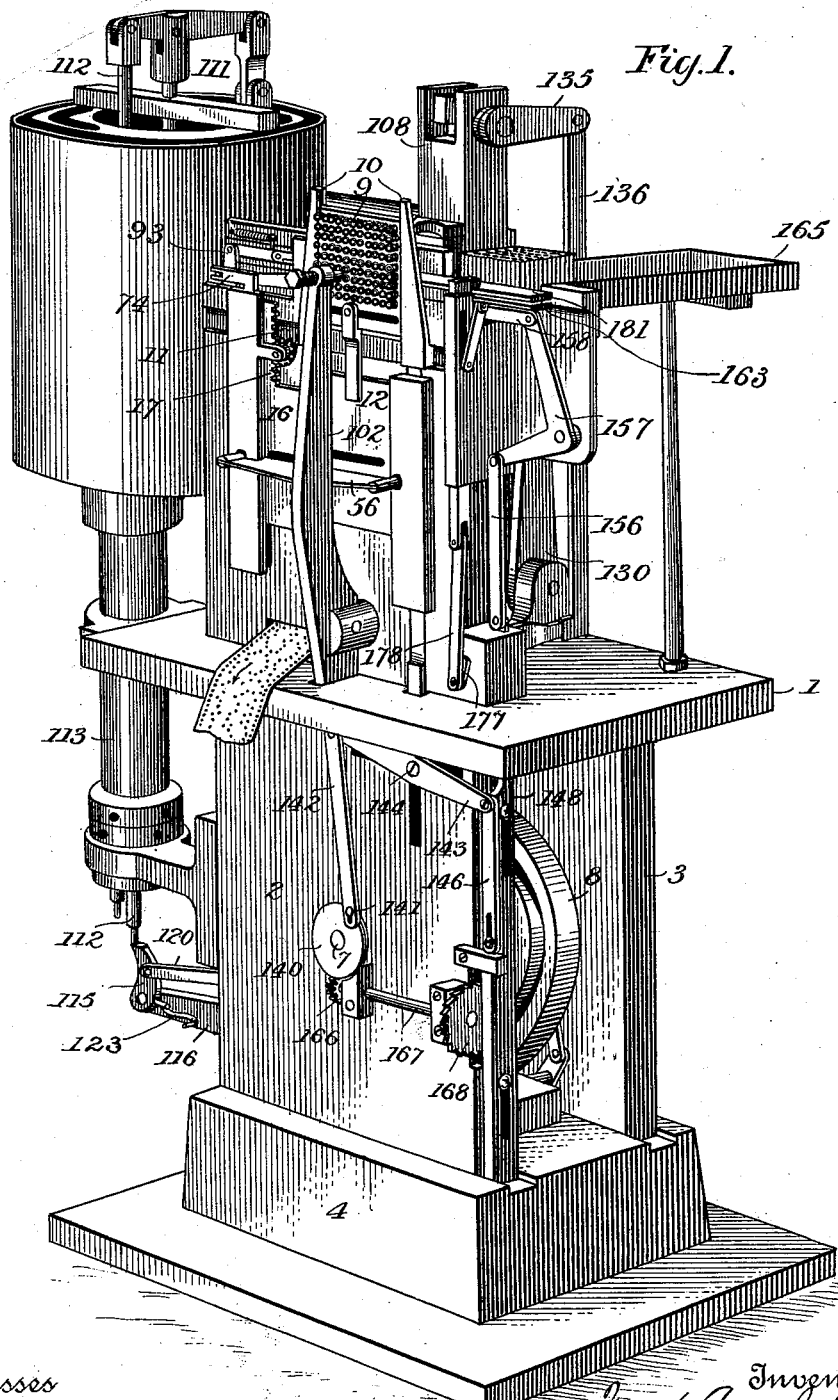
Figure 2:
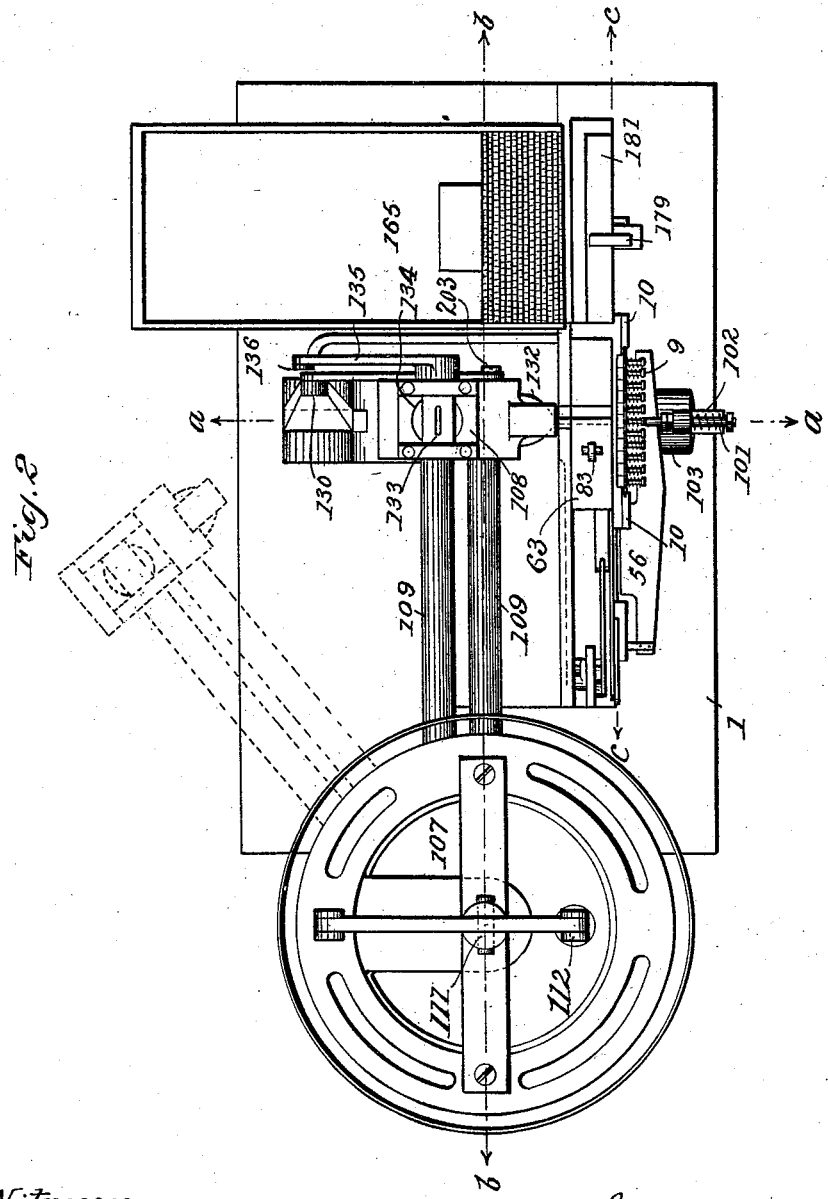
Figure 3:
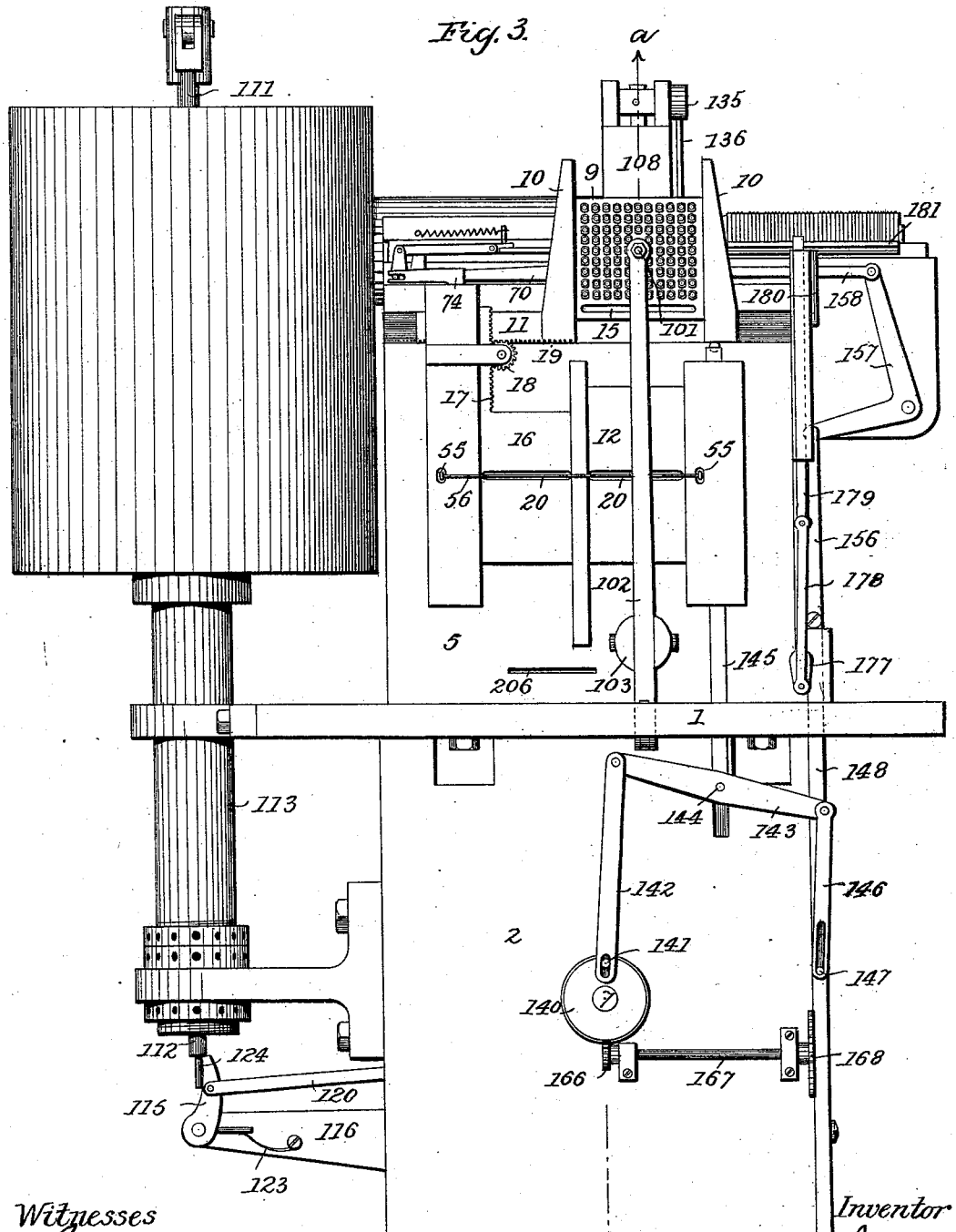
Figure 4:
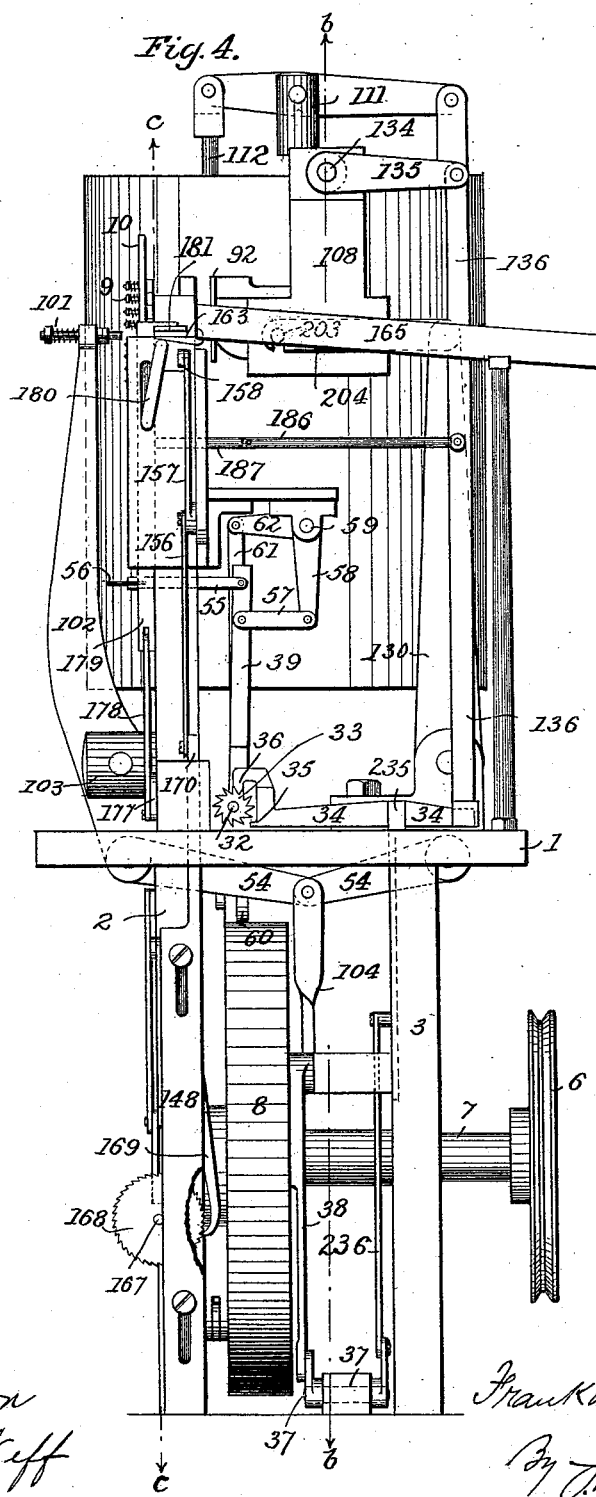
Figure 5:
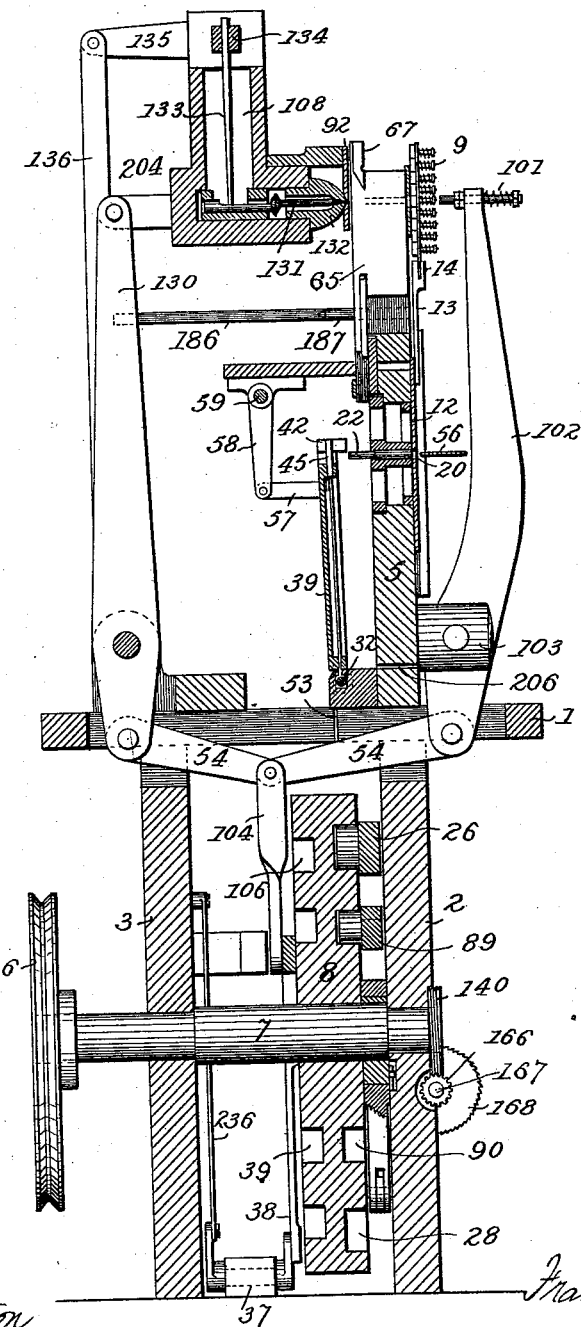

Figure 1 is a perspective view of a complete machine embodying my invention. Fig. 2 is a plan view thereof on a larger scale. Fig. 3 is a front elevation. Fig. 4 is an elevation of the machine looking at it from the right side. Fig. 5 is a sectional elevation taken on the lines *a—a* of Figs. 2 and 3. Fig. 6 is a sectional elevation taken on the lines *b—b* of Figs. 2 and 4. Fig. 7 is a sectional view taken on the line *c—c* of Figs. 2 and 4, parts being broken away. Fig. 7ª is an enlargement of a part of Fig. 7, the type hook being shown in full lines moving a line of type and in dotted lines returning for the next line of type. Fig. 8 is a rear view of the upper standard of the machine, taken from the plane indicated by the line *i—i* of Fig. 10. Fig. 9 is a similar view taken from a plane at the left of Fig. 10, the feeler frame being removed. Fig. 9ª is an enlargement of a portion of Fig. 9 showing the jet slide away from the mold. Fig. 10 is a section on the line *d—d* of Figs. 8 and 9. Fig. 11 is a section on the line *e—e* of Fig. 9. Fig. 12 is a front view of the frame carrying the feelers. Fig. 13 is a section on the line *g—g* of Fig. 14. Fig. 14 is a section on the line *h—h* of Fig. 13. Fig. 15 is a detail of the devices for transferring the type to the galley. Fig. 16 is a detail showing the pump operating device. Figs. 17 and 18 are details of the mold, and Figs. 19 to 22 inclusive, are details illustrating the mold and the manner of seating the dies upon the mold.

The working parts of the machine are mounted as usual upon a main frame of suitable construction. In the drawings, this frame is shown as consisting of a table 1 supported upon front and rear plates 2—3 which in turn are supported upon a base 4. The table 1 supports a vertical standard or plate 5 upon which many of the working parts of the machine are mounted. Power is transmitted to the various working parts through the medium of a pulley 6, and shaft 7 mounted in the lower standards 2—3, and suitable cams and an eccentric upon said shaft. In the present instance most of the movements are timed and controlled by a series of cam surfaces formed upon a single cam disk 8.

The dies are mounted in rows in a plate or carrier 9 which is arranged to slide vertically in a yoke consisting of arms 10 connected with a horizontal slide 11 which moves in guides upon the standard 5 (Figs. 1 and 3). By moving the die carrier horizontally and vertically, it will be evident that any selected die can be brought to the casting point, that is, opposite to the mold.

The vertical movements of the carrier are accomplished by means of a slide 12 having an arm 13, the upper end of which has a pin 14 engaging a slot 15 in the lower edge of the plate 9 (Figs. 3 and 5). The horizontal movements of the carrier are communicated from a vertically moving slide 16 having an upwardly extending rack 17 which communicates motion to a pinion 18, said pinion being also in mesh with a rack 19 upon an edge of the slide 11. The slides 12 and 16 stand normally at their central positions and maintain the die carrier with the casting or impression point opposite or nearly opposite its center.

These slides are moved up or down to select dies by mechanism which will be now described.

The slides 12 and 16 are provided with transverse slots 20, in the rear of which are a pair of disks or gears 21 connected so as to move simultaneously and each provided with a diametrical row of pins 22 (Figs. 5, 7, 8 and 9). These parts 21 I shall term selecting-pin carriers. The selecting pin carriers 21 turn in circular bearings in the plate 5 and are provided with gear teeth which intermesh so that they turn or rock in opposite directions. The selecting pins 22 are arranged in the carriers corresponding with the rows of dies in the die carrier. In each carrier there is a central pin corresponding to the central vertical and transverse rows of dies and on each side of the central pins there are other pins corresponding to the side rows of dies. As shown, the right hand selecting-pin carrier is arranged to move the die carrier vertically, and the left hand pin carrier imparts horizontal movement to it. To select a given die a pin in the right hand pin carrier is pushed forward into the slot 20 of the slide 12 and a pin in the left hand carrier is pushed into the slot of the slide 16. A quarter of a revolution is then given to the pin carriers and the die carrier is moved so as to bring the die corresponding to the selected pins opposite the impression point. The means for pushing forward and retracting the selecting-pins will be described presently. The selecting-pin carriers are given a quarter of a revolution at each revolution of the movement shaft 7, and then returned to their normal positions after an impression has been made from the matrix selected by means of a connecting rod 25, cam lever 26, roller 27 and cam groove 28 in the disk 8.

The selecting of the pins 22 is controlled through suitable mechanism by a mechanical controller, which in the present instance is a strip of paper having perforations representing the letters to be selected. Such a mechanical controller is fully described in my pending application, Serial No. 510,661, filed May 9, 1894.

The perforated paper strip or controller 30 is fed into the machine from the back and passes out through a slot 206 in the standard 5. It is fed by a pair of pin wheels 31 upon a shaft 32 provided with a star wheel 33 (Figs. 4 and 12). This star wheel is fed forward one tooth at each revolution of the cam shaft by means of an arm 34 carrying a projection 35 which starts the star wheel forward as the arm is raised and a pawl 36 which enters the notch in the star wheel, imparts to it its remaining movement and locks it accurately in the proper position when the arm is lowered. The arm 34 is attached to a slide 235 which is connected by a link 236 with a rock shaft 37 which latter is operated by a cam lever 38 and a cam groove 29 upon the cam wheel. Above the shaft 32 a rocking frame 39 is mounted on journals 40 (Figs. 4, 5, 6 and 12). This frame carries a series of rods or wires corresponding to the various perforations in the controller strip 30. The lower ends of these rods slide in perforations in the lower bar 41 of the frame 39, the lower edge of this bar being in line with the axis of the journals 40 so that the lower ends of the rods will not be shifted laterally by the rocking of the frame. These rods constitute feelers and they are periodically dropped upon the paper strip and such as are opposite the perforations of the strip drop into them. The feeler rods spread at their upper ends and are connected with a series of plates 42 which are free to move vertically in guide slots 43 in the upper cross bar 44 of the vibrating frame. As shown, the plates 42 are mounted upon short plungers 45 which move in perforations in the cross bar 44 and to the lower ends of which the feelers are connected. The plates 42 project forwardly from the frame and in their normal or upper positions they pass over the selecting-pins 22 when the feeler frame 39 is pushed forward. Each of the feelers has a tendency to descend given to it by its weight and also by a light spring 46 connecting its striker 42 with a fixed bar 47 upon the feeler frame. The feelers are raised by a transverse bar 48 the upper edge of which underlies the plungers 45. The bar 48 is supported by a pair of bell cranks 49 and 50 pivoted upon the back of the frame, said bell cranks being connected to the bar 48 by links 51 and to each other by a link 52. The bell crank 50 is operated periodically by a rod 53, the foot of which rests upon one of a pair of toggle levers 54 operated from the cam wheel in a manner to be hereinafter described (Figs. 5 and 12). Each time that the feelers are raised the controller strip is fed forward to present a new set of perforations to the feelers when they again descend.

Connected with the feeler frame by a pair of arms 55 extending through the standard 5 is a transverse bar 56 (Figs. 1, 3, 4 and 5) which I will term a restoring bar for returning or restoring the pins to their normal positions as the feeler frame is vibrated rearward. The feeler frame stands normally in a middle position and it is moved first to the rear to return the pins previously pushed out; then it is given its full stroke forward thereby setting new selecting pins; and lastly it is drawn back to the middle or normal position which is shown in Fig. 5. The devices for moving the feeler frame consists of a rock shaft 59 which receives suitable and timely movements from the outer surfaces of the cam wheel 8 through the medium of cam lever 60, connecting rod 61 and rock arm 62 (Figs. 4, 5 and 6).

The mold is situated directly in the rear of the die carrier. It is composed of upper and lower sections 63 and 64 separated by a space equal to the thickness of the type to be cast, a vertically sliding section 65 which closes the right hand side of the mold, and a horizontal sliding section 66 movable in the space between the upper and lower parts and closing the left hand side of the mold (Figs. 7, 8, 17 and 18). The parts 63 and 64 are connected by a piece 208 or they may be formed integral. They yield or spring slightly so that they may be clamped tightly upon the section 66 to close the mold. The vertically sliding section 65 when in its lowest position opens the mold so that the type may be pushed out laterally by the plunger section 66 as shown in Fig. 7. In this position the upper end of the part 65 forms a portion of a runway to support the type as they are ejected from the mold. Upon an upward and rearward projection of the mold section 65 is a knife 67 which trims the jet from the type as the section descends. The section 65 is reciprocated by a link or rod 68 which connects it with a small gear 69 in mesh with the teeth of one of the selecting pin carriers 21 (Fig. 8).

The width of the mold is regulated by the position of the sliding section 66 controlled by a lever 70, the shorter arm 71 of which engages with the section. The longer arm of the lever 70 has a pin 72 in engagement with a slot 73 in a vertically moving slide 74 (Fig. 8). The slide 74 is periodically drawn upward yieldingly by a spring 75, the upper end of which is connected to a rack 76 in mesh with the left hand selecting pin carrier. Each time said carrier is reciprocated, the rack 76 is raised and the tension of the spring 75 tends to raise the slide 74 and to close the mold. The extent of upward movement of the slide 74, and hence the width of the mold, is limited by a variable stop device which as shown consists of a block 77 having on its rear side a series of steps 78. The steps 78 engage any one of a corresponding series of pivoted stops 79 which happens to be pressed forward and these stops are operated by certain of the strikers 42 attached to the feelers in the same manner in which the selecting pins are operated. As shown, the stops 79 have notches 80 into which the strikers normally work; but when a striker is lowered it engages the shoulder below the notch and forces in the stop, which in turn engages the stepped piece 78 and regulates the width of the mold. An arm 81 upon the feeler frame extends in front of the stops 79 and draws the last operated stop back after each letter is cast and before the mold is set for the next one. It will thus be seen that the width of the mold is regulated by perforations in the controlling strip acting through a set of feelers. As shown the six feelers on the left in Fig. 12 are used for this purpose.

The mold sections are clamped together vertically by a lever 82 which draws down a rod 83 overlying the upper section and they are clamped horizontally by a lever 84 (Fig. 7). The levers 82 and 84 are operated simultaneously by a pair of toggle levers 85, one of which is connected to a vertical slide 86 by a link 87. The slide 86 is operated through the medium of the link 88, cam lever 89 and cam groove 90. Upon the upward movement of the slide 86 a lever 91, which is pivoted at 95 to the main frame, is thrown forward which forces the jet slide 92 into position with its perforation opposite the mold and its inner end against the mold section 65, which section extends for some distance back of the parts 63 and 64. With the downward movement of the slide 86 the lever 93 is thrown to the right, carrying with it the mold section 66 and ejecting the type from the mold and into a groove or run way 94. The lever 93 is pivoted to the main frame at 95 and is provided with a cam slot 96 in which runs a pin 97 connected with the slide 86. The lever 91 is similarly operated by a cam slot 200 in which the pin 97 runs (Fig. 9). The sliding section 66 of the mold is normally drawn back against the lever arm 71 by a spring 98 (Fig. 7). Said slide is free however to move to the right to eject the type as shown in said figure and the enlarged upper end of the slot 96 permits the slide to be properly adjusted to different widths of type.

Referring to Figs. 19 to 22 inclusive it will be seen that the dies or matrices are 99 loosely seated in the die plate 9. They are provided with rectangular heads which are normally drawn against the die plate by means of springs 100. After a die is positioned in front of the mold, it is pressed firmly against the face of the mold by means of an impression pin 101 which forces the head of the die through a directrix 201 in a plate 202. The impression pin 101 is loosely seated in a conical hole in the end of the impression lever 102 which is pivoted to a stud 103 on the standard 5 (Figs. 3, 4 and 5). The impression lever 102 is operated periodically through the medium of the toggle levers 54, connecting rod 104, cam lever 105 and cam groove 106.

Considerable importance is attached to the manner in which the dies 99 and the impression pin 101 are mounted, as by this means the face of the die is brought with absolute accuracy against the mold and the formation of perfect type secured, there being no crevices in which fins might be formed.

Fig. 19 illustrates the usual operation of pressing the die against the mold. In this figure, the die and impression pin are both shown in line with the mold. If, however, a die were slightly out of adjustment with the die plate, the impression pin would engage it, as shown in Fig. 20, and if the impression pin were rigidly connected with the impression lever 102, the die would not be brought accurately against the mold, but instead would be inclined thereto, as shown in said figure.

On account of the lateral freedom of the die and the impression pin at their engaging ends, the former seats itself accurately upon the mold, as shown in Fig. 21, and the latter is forced slightly to one side by the movement of the die. If the face of the matrix were not exactly at right angles to its stem, it would in a similar manner be seated accurately upon the mold by reason of the lateral yielding of the impression pin, as shown in Fig. 22.

In Figs. 20, 21 and 22 the errors of adjustment are for the purpose of illustration. I have found that when the dies and impression pin are mounted as has been described, that is to say, free to yield laterally at engaging ends, excellent results are always obtained even when there are slight irregularities in the adjustment of the dies. It is of course essential that the faces of the dies be accurate planes, and that the face of the mold should be a plane surface also. While I have shown square dies, it will be understood that dies of any other outline may be substituted, the directrix being made to correspond. As shown the outer edges of the directrix are rounded to facilitate the entrance of the die.

The melting pot is formed in two parts, the larger part 107 and a smaller part 108 connected by pipes 109 (Figs. 5 and 6). Both sections of the melting pot and connecting pipes are heated by gas burners 110. The pump 111 is of the usual construction. It is operated by a rod 112 extending down through the hollow standard 113 which supports the melting pot. This rod is drawn down by a spring 114 and is periodically raised by a pawl 115 (Figs. 6 and 16). The pawl 115 is mounted upon one end of a lever 116, the opposite end of which is connected to the arm 117 upon the strap 118 of an eccentric 119 upon the shaft 7. In order to release the pawl 115 from the lower end of the rod 112 at the proper time to operate the pump, a rod 120 is connected to the pawl and provided with a hook or off-set 121 which is engaged by a pin 122 projecting from the face of the eccentric 119 (Fig. 16). The pawl is normally thrown into engagement with the lower end of the rod 112 by a spring 123. A pin 124 in the lower end of the rod 112 forms a stop for the pawl. The smaller section 108 of the melting pot has a slight movement to and from the mold. This movement is imparted to it by a lever 130 (Figs. 2, 4 and 5), the lower end of which is connected with one of the toggle levers 54. The upper end of the lever 130 is connected to a pin 203 on the melting pot by a latch 204. When the connecting rod 104 is forced up as heretofore described, the toggle levers are straightened and the impression lever 102 is forced against the die at the front of the mold while the nipple is simultaneously forced against the opposite end of the mold thus equalizing the pressure upon opposite ends of the mold and avoiding any tendency to disturb it. There is a choker 131 arranged in the nipple 132 in the usual manner. This choker is operated by a lever 133, rock shaft 134, rock arm 135 and a rod 136 connected at its upper end to the rock arm while its lower end normally rests upon the arm 34 carried by the slide 35 (Fig. 4).

On a disk 140 on the front end of the cam shaft 7 is a crank pin 141 which passes through a slot in the lower end of the connecting rod 142. The upper end of this rod is connected to the left end of a lever 143 which is centrally pivoted at 144 to the lower end of a vertical slide 145. To the right hand end of the lever 143 is connected a link 146 which has a slot in its lower end into which projects a pin 147 fixed upon a weighted slide 148, (Figs. 3 and 7.) The slide 148 being weighted is normally at rest while the slide 145 is moved up and down by the action of the crank 141. When, however, the motion of the slide 145 is intercepted, the lever 143 will turn on the pivot 144 and the slide 148 will be raised. The motion of the slide 145 is stopped at the end of each line by an arm 149 projecting through the plate or standard 5 and rigidly connected to a bolt 150 (Figs. 7, 9 and 11). The bolt is operated by a bell crank lever 151 which in turn is moved forward at the end of each line by means of a special striker 152 (Fig. 12) operated by a feeler 153. The feeler 153 drops into a perforation which is formed to indicate each line of subject-matter upon the mechanical controller and through the parts enumerated the arm 149 of the bolt 150 is thrown into a notch 154 in the slide 145 and retained in said notch during the revolution of the cam shaft, by a spring latch 155 (Fig. 7). During the next revolution of the cam shaft, the weighted slide 148 is raised. The upper end of this slide is connected by a link 156 with a bell crank 157 and to the upper arm of the bell crank is connected a rod 158 which extends under the line of type in the run way 94 and is provided at its extreme end with a type hook 159. This rod 158 rests upon a spring 160 which tends to throw it up into the type channel 94. As the rod 158 moves to the left, the type hook is forced down by a guide 161 operating on a pin 161$^a$ and a projection of the rod passes under a shoulder 162 upon the mold section 65. At the end of each line the weighted slide 148 is elevated as heretofore described and through the medium of the bell crank lever 157, the type hook is drawn to the right. As it is released from the shoulder 162 (Fig. 7) it springs up behind the last formed type and then draws the whole line of type onto a movable leaf 163 opposite the galley (Figs. 1, 4, and 15). During the next revolution of the cam shaft, the slide 145 rises and a pin 29 lifts the latch 155 and releases the arm 149 of the bolt, which is thereupon withdrawn from the notch 154, and the slide 145 plays idly up and down as before.

During the revolution of the cam shaft at the end of a line, while the slide 145 is locked in its uppermost position, it is desirable that the choker remain closed, as no character is to be cast. To accomplish this a push pin or slide 186 is arranged to reciprocate normally in the path of the slide 145, but timed to move out of said path when the slide 145 rises and return when it descends. The pin 187 is reciprocated by link 186 connecting it with the choker operating rod 136. As above related the slide 145 is locked up at the end of each line, and, during the corresponding revolution of the cam shaft, as choker operating rod 136 starts to rise it is forced off of the arm 34 by the link 186, the slide or push pin 187 being prevented from moving forward by the slide 145, and the choker does not open for that revolution. At the succeeding revolution the choker rod swings back onto arm 34 and the choker operates as before until the next line is ended.

The leaf 163 is pivoted at 164 and adapted to be thrown into a vertical position to transfer the line of type to the galley 165 as shown in dotted lines (Fig. 15). The movement of the leaf 163 is communicated through various connections from the weighted slide 148 as it descends, and as it is desirable that this movement should be slow I provide mechanism for regulating it as follows: Upon the front end of the shaft 7 is a worm wheel 140 (Figs. 1, 3, 4 and 5) which slowly drives a pinion 166 upon a small shaft 167. Upon the right hand end of this shaft is a ratchet wheel 168. As the weighted slide 148 descends, a pawl 169 attached to it engages the teeth of the ratchet wheel 158 and as the ratchet wheel turns slowly the slide is regulated in its descent accordingly.

The connections between the weighted slide 148 and the leaf 163 for transferring the type to the galley (Figs. 3, 4, 7, 13, 14 and 15) are as follows: The slide 148 has a rack 170 which meshes with a pinion 171 loose upon a shaft 172. Rigidly connected with the pinion is a disk 173 having a notch 174. Upon one end of the shaft 172 is an arm 175 fixed to the shaft and carrying a pawl 176 which is engaged by the notch in disk 173 as the rack 170 descends. The shaft 172 is thus turned and a crank 177 upon its opposite end, through the medium of connecting rod 178 raises the slide 179. The slide 179 is connected to the table or leaf 163 by a connecting rod 180. This slide at its upper end also carries a plate 181 (Figs. 3 and 15) which overlies the leaf 163 when the slide 179 is in its lowest position, thus forming a guideway or channel to prevent the type line from disturbance as it is drawn over from the casting mechanism to the galley. As the slide 179 rises the plate 181 is carried upward out of the way and the leaf transfers the type to the galley, as shown in dotted lines (Fig. 15).

The operation of the machine is as follows: The perforated strip of paper is fed into the machine and over the feed rolls 31 by a step by step movement, the paper stopping during each revolution of the cam shaft while the feelers are lowered upon it. When the perforations representing a character and its space are under the feelers, two feelers drop into the character selecting perforations and their strikers 42 are brought opposite selecting pins 22. At the same time a lever will drop into a perforation representing a space and its striker will be brought opposite the shoulder of the lever 79. The feeler frame is then brought backward to return the previously operated selecting pins and then quickly pushed forward, while the feelers remain in the perforations, the effect of which is to push out a selecting pin in each of the carriers and a lever 79. The selecting pin carriers are then rocked and through the connection with the die carrier the die corresponding with the perforations in the strip is brought opposite the mold. At the same time the slide 74 is drawn up until the stepped block 48 is intercepted by the lever 79 which has been pushed forward and the section 66 of the mold is thus forced to the right by the lever 70 until the mold opening exactly corresponds with the width of the body of the character upon the selected die. The upper half of the mold, which is slightly movable, is then clamped upon the part 66 by the parts 82 and 83 and it is simultaneously clamped against the vertically moving part of the mold 65 by lever 85. In this manner the four sides of the mold are securely clamped together with the mold opening of the exact size for the selected character. Simultaneously with the clamping of the mold the jet slide 92 is thrown into position in the rear of the mold by the lever 91. The nipple of the melting pot is then forced against the jet slide in the rear and the die simultaneously pressed against the face of the mold. The die impressing lever 102 and the lever which moves the mold are connected and operated by the toggle levers 54 and the pressure upon each side of the mold is thus equalized and no strain is brought upon it. The choker is now withdrawn, the pump operated and a type cast in the mold, after which the die and nipple and jet slide are retracted. The vertically moving side of the mold is then drawn down carrying with it the knife 67 which trims the rear end of the type. The section 65 moves down until its upper end is even with the bottom of the mold. The section 66 of the mold is then moved to the right ejecting the type over the section 65 into the runway 94. The above cycle of operations is repeated until the several characters and spaces constituting a justified line are cast and forced into the runway. At the end of the line a line stop hole in the paper strips comes opposite the feeler 153 and the latter drops into it thus lowering its striker 152 into position to engage the depending arm of the lever 151, rocking said lever and throwing the arm 149 of the bolt into the notch 154 of the slide 145 (Figs. 7, 9, 10, and 11). During the succeeding revolution the cam shaft, the lever 143 is rocked, the slide 148 raised, and the type hook 159 released and thrown up in the rear of the line of type assembled in the runway, and the line then drawn over by the hook into an elevating leaf 163. The rack 148 is heavy and descends by gravity and its weight of descent is regulated by means of a pawl connected with the rack which engages and rides down upon a slowly moving ratchet wheel 168 (Figs. 3, 4 and 5). As the rack 148 descends, it engages through the medium of the devices shown in Figs. 13 and 14, with a slide 179 which is thus slowly raised and lowered. The slide 179 is connected by a link 180 with the leaf upon which the line of type has just been deposited and this leaf is slowly vibrated into a vertical position, depositing the line of type in the galley 165 and then returns to receive the succeeding line. When the bolt 154 is thrown to the right, its arm 149 is caught by the latch 155 and kept in this position while the rack 148 is being elevated. When the motion of the lever 143 (Fig. 7) is reversed a pin 29 raises the latch 155 and releases the bolt which is drawn backward by the spring 207 (Fig. 11). The slide 145 then plays idly up and down until another line hole is presented to the feeler 153.

It will be evident that many changes in the details of construction and arrangement of my improved machine may be made without departing from the spirit and scope of the invention. For instance, the rocking carriers might simply be provided with transverse series of perforations and the selecting pins might be mounted in slides and adapted to be projected one at a time into the carriers, thus merely reversing the arrangement shown.

In the above specification I have generally confined the description to the preferred form of the invention, but at the same time I do not desire to limit myself to the precise construction and arrangement of mechanism illustrated and described.

Having described my invention, what I claim is—

1. A selecting device consisting of a rocking carrier, a series of selecting pins arranged in the carrier and movable therein in the direction of its axis and a part adjacent to the carrier and adapted to be moved by projected pins of the carrier when the latter is rocked, substantially as described.

2. The combination with a movable die-carrier provided with a series of dies, of means for controlling its movement consisting of carriers provided with selecting pins, and connections of the die-carrier disposed adjacent to said pin-carriers and adapted to be moved by means of the pins, when said carriers are actuated, substantially as described.

3. The combination with a movable die carrier or part, of means for controlling its movements consisting of a pair of rocking carriers, each provided with a transverse row of selecting pins, said pins being movable in the direction of the axis of the pin carriers, and connections of the die carrier adjacent to the selecting pin carriers and adapted to be moved by projected pins when the carriers are rocked, substantially as described.

4. The combination with a group of dies and a die carrier movable in two directions to center selected dies, of two rocking selecting pin carriers provided with rows of selecting pins, means for projecting the pins and for rocking their carriers, and connections of the die carrier arranged adjacent to the pin carriers and adapted to be moved by projected pins when the latter carriers are rocked, substantially as described.

5. The combination with a die-carrier movable in certain directions to center selected dies, of a movable selecting pin-carrier provided with selecting pins and a slide connected with the die carrier and adapted to be moved by projected selecting pins, substantially as described.

6. The combination with the die carrier movable in two directions to center selected dies, of rocking selecting pin carriers provided with diametrical rows of selecting pins, a pair of slides adjacent to the pin carriers and adapted to be moved by projected pins when the carriers are actuated, and the connections between said slides and the die carrier, substantially as described.

7. The combination with a slide having a yoke extending at right angles thereto, of a die carrier movable in the yoke, a pair of slides provided with slots, one of said slides being connected with the yoke slide and the other connected with the die carrier through suitable mechanism, rocking selecting pin carriers arranged adjacent to said slides and each provided with a row of pins, and means for projecting the pins into the slots of the slides whereby the latter are moved when the pin carriers are actuated, substantially as described.

8. The combination with a rocking carrier having a series of selecting pins movable therein in the direction of its axis, of a controller and means for projecting the pins, said means being governed by the controller, substantially as described.

9. The combination with a rocking carrier having a transverse row of pins movable therein in the direction of the axis of the carrier, of a controller, feelers arranged to be rendered operative by the controller, and means for projecting the pins corresponding with the operative feelers, substantially as described.

10. In a composing machine, the combination with a controller, of a feeler frame, a series of movable feelers thereon, means for periodically applying the feelers to the controller, strikers connected with the feelers, said strikers being adapted to be rendered operative by the action of the controller upon the feelers, and means for moving the operative striker, substantially as described.

11. The combination of a movable feeler frame, a series of feelers mounted in the frame, mechanism for applying the feelers to a controller strip periodically, strikers connected with the feelers, said strikers being carried by the frame and being movable therein to operative positions when their respective feelers enter perforations in the strip, and means for moving the frame, substantially as described.

12. The combination of a frame adapted to rock upon an axis coincident with its lower edge, feelers carried by the frame and having their lower ends in line with the axis, strikers movably mounted in said frame and connected with the feelers, means for periodically lowering and raising the feelers, and means for rocking the frame upon its axis, substantially as described.

13. The combination of the rocking selecting pin carriers, each provided with a row of movable pins, of a feeler frame arranged adjacent to the carriers, a series of feelers adapted to be rendered operative by a controller strip, and a series of strikers carried by the frame and connected with the feelers, said strikers being movable to engage the selecting pins when their respective feelers are rendered operative by the controller strip, substantially as described.

14. The combination with a group of dies and a die carrier movable in two directions to center selected dies, of a pair of rocking selecting pin carriers, each provided with a row of pins individually movable in the direction of its axis, parts connected with the die carrier and arranged to be engaged by the pins of the pin carrier, a feeler frame arranged on the opposite side of the pin carriers, movable feelers and strikers mounted in the feeler frame, said strikers being moved opposite the pins of the pin carriers when their respective feelers are rendered operative, and means for moving the strikers against the pins, substantially as described.

15. In a composing machine, the combination with a rocking selecting pin carrier having a row of pins adapted to be projected individually in the direction of its axis, of a feeler frame in the rear of the carrier, a set of feelers mounted therein and a set of strikers connected with the feelers and adapted to be moved opposite the selecting pins to drive them forward and render them operative, a restoring bar in front of the pins for returning them to their inoperative positions, and means for moving the strikers and restoring bar alternately to and from the carrier, substantially as described.

16. The combination with a sectional mold, a movable rod, and connections between the rod and mold to vary the opening of the latter, of a controller, a series of feelers adapted to be rendered operative by the controller, and stepped connections between the feelers and the rod, substantially as described.

17. The combination with the mold having sections which are relatively movable to vary the mold opening of a lever operatively connected to a movable section, means for adjusting said lever to vary the mold opening, and means for moving said section across the mold to eject the type, substantially as described.

18. The combination with a mold having sections which are relatively movable to vary the mold opening, of a lever having its shorter arm engaging a movable section, means for moving the longer arm of the lever to vary the mold opening, and a stepped stop for variably limiting said movement, whereby the mold opening may be varied to cast type of different widths, substantially as described.

19. In a composing machine a mold having its sides closed respectively by a vertically and a horizontally sliding section, a runway for the type in line with the horizontally sliding section, means for moving the vertical section to open and close one side of the mold, means for adjusting the horizontal section and holding it while the mold is closed by the vertical section, and means for moving the horizontal section to eject the type while the mold is opened by the movement of the vertical section, substantially as described.

20. The combination with the mold having horizontally and vertically moving sections adapted to close its sides, said vertical section being also movable to open the mold, a runway in line with the horizontally moving section, an elevating leaf in line with the said runway, a galley in the rear of the leaf, means for moving the type through the runway onto the leaf, and means for periodically elevating the leaf to transfer the completed lines to the galley, substantially as described.

21. In a type casting and composing machine, the combination with the mold and means for varying the mold opening, of a runway in line with the mold, an elevating leaf in line with the runway, a galley, a hook arranged to draw lines of type onto the leaf, and means rendered operative on the completion of each line for operating the leaf and transferring the lines to the galley, substantially as described.

22. In a type casting and composing machine the elevating leaf for transferring lines of type to the galley, a power shaft, mechanism for moving the leaf to transfer the type to the galley, and devices for imparting movement from the power shaft to said mechanism at the completion of each line, substantially as described.

23. In a type casting and composing machine the elevator for transferring lines of type to the galley, in combination with a slowly moving ratchet or part, and mechanism constructed to engage the elevator with the ratchet or part at the completion of each line, whereby a slow movement is imparted to the former by the latter, substantially as described.

24. The combination with a mold and a die adapted to be seated against the mold, of a plunger or impression pin for seating the die, the engaging ends of said die and pin having freedom to yield laterally, substantially as described.

25. The combination with a mold of a die plate, dies carried by said plate, a movable part and an impression pin carried by said part for pressing the dies to the mold, said dies and impression pin being mounted with freedom to yield laterally at their engaging ends, whereby the faces of the dies may be accurately seated upon the mold, substantially as described.

26. The combination with a mold, of a die-plate, dies carried by said plate, a directrix, and an impression pin, said dies and pin having freedom to yield laterally at their engaging ends, whereby the dies may be accurately aligned and seated upon the mold, substantially as described.

27. The combination with a two-part mold, of an aligning plate in front of the mold, dies, and an impression pin for seating said dies upon the front of the mold, means for clamping the mold-sections together, a melting-pot having a nipple, and means for moving the melting-pot to close the rear end of the mold, substantially as described.

28. In a type casting and composing machine a mold the upper and lower sections of which are connected with sufficient freedom for slight relative movement, the sliding section arranged between said upper and lower sections, and means for clamping the upper and lower sections on the sliding section, substantially as described.

29. In a type casting and composing machine the mold having upper and lower sections arranged for slight relative movement, a horizontally sliding section between said sections and adjustable to vary the mold opening, a vertically sliding section arranged to open and close one side of the mold, levers pivoted on the main frame and arranged to bear upon the mold sections to clamp all of said sections, a power shaft and connections from the power shaft for operating said clamping levers, substantially as described.

30. In a type casting machine, the combination with the mold, and a die and nipple movable toward and from opposite ends of said mold, of levers adapted to bear respectively upon the die and nipple to close the mold, connections between said levers whereby the pressures upon the die and nipple are equalized, and means for operating said connections, substantially as described.

31. In a type casting machine, the combination with the mold, and a die and melting pot movable toward and from opposite ends of said mold, of levers adapted to bear respectively upon the die and melting pot to close the mold, toggle arms connecting said levers, and means for operating the toggle arms whereby the pressures upon the front and rear of the mold are equalized, substantially as described.

32. In a type casting machine the melting pot and pump, and the pump operating rod, in combination with a pawl for engaging the pump rod to move it in one direction, means for moving it in the opposite direction, and means for releasing the rod from the pawl at a determined point in the travel of the pawl, substantially as described.

33. In a type casting machine, the melting pot and pump, and the pump operating rod, in combination with a power shaft, a lever operated by the shaft, a pawl carried by the lever and arranged to raise the pump rod, a rod extending from the pawl to the power shaft, and means for engaging said rod with the shaft at a determined point in the movement of the pump rod whereby the pawl is disengaged from said pump rod, substantially as described.

34. In a type casting machine the melting pot revoluble upon a hollow standard and having its pump operating rod extending through said standard whereby the nipple may be thrown back from the mold without disconnecting the pump rod from its operating mechanism.

In testimony whereof I affix my signature in presence of two witnesses.

F. AMOS JOHNSON.

Witnesses:
E. A. HENDRICKSON,
J. A. WATSON.